(12) United States Patent
Minchey

(10) Patent No.: US 6,179,563 B1
(45) Date of Patent: Jan. 30, 2001

(54) WIND-POWERED DRIVE SHAFT

(76) Inventor: Mark Eugene Minchey, 1845 S. 1630 East, Price, UT (US) 84501

(*) Notice: Under 35 U.S.C. 154(b), the term of this patent shall be extended for 0 days.

(21) Appl. No.: 09/396,893

(22) Filed: Sep. 15, 1999

Related U.S. Application Data

(63) Continuation-in-part of application No. 08/603,065, filed on Feb. 20, 1996, now abandoned.

(51) Int. Cl.$^7$ ........................................................ F03D 7/06
(52) U.S. Cl. ........................ 416/17; 416/119; 416/132 B; 415/4.2
(58) Field of Search ........................ 416/17, 119, 132 A, 416/132 B, 140 R, 140 A; 415/4.2, 4.4, 907

(56) References Cited

U.S. PATENT DOCUMENTS 1,794,930 * 9/1931 Spencer .................................. 416/119

* cited by examiner

Primary Examiner—Edward K. Look
Assistant Examiner—James M McAleenan
(74) Attorney, Agent, or Firm—Thompson E. Fehr

(57) ABSTRACT

A wind-powered drive shaft, the rotary force of which can be used for a variety of purposes, such as to drive a hydraulic pump, the crankshaft for a water pump, or an electrical generator. To a central shaft are attached two or more sets of arms extending radially outward from the central shaft and containing two or more arms each. Preferably the sets of arms are arranged in pairs about the central shaft. Each set of aims has two or more aims. Two or more pivot shaft are rotatably attached to each arm in a set of arms and between vertically adjacent arms a vane composed of light but strong material is connected to each pivot shaft. Attached to one of every two vertically adjacent arms is a stop, said stop being in such a location that the free end of the vane will contact said stop when such free end makes its closes approach to said central shaft. A wind will, therefore, blow the vane open on one side of the central shaft and will blow the vane against the stop, thereby generating a torque, on the other side of the central shaft. This will, of course, impart the desired rotary motion to the central shaft. Offset arms connected to each pivot shaft on a given set of arms and a rod rotatably such offset arms coordinate the movement of vanes on the set of arms to preclude such vanes from becoming entangled with one another.

16 Claims, 2 Drawing Sheets

WIND-POWERED DRIVE SHAFT

CROSS-REFERENCE TO RELATED APPLICATION

This is a continuation-in-part of U.S. application Ser. No. 08/603,065, filed on Feb. 20, 1996, now abandoned.

BACKGROUND OF THE INVENTION

1. Field of the Invention

This invention relates to a drive shaft that is turned by the wind and the rotary power of which can be utilized for a variety of purposes, such as to drive a hydraulic pump, the crankshaft for a water pump, or an electrical generator.

2. Description of the Related Art

A number of patents have been issued for devices which have only one vane on each of several arms that are designed to provide rotary motion to a central shaft when the vane on or more arms intercepts the wind. These include U.S. pat. No. 2,247,929; U.S. pat. No. 4,115,027; U.S. pat. No. 4,203,707; and U.S. pat. No. 4,818,180. Of these patents, only U.S. Pat. No. 4,203,707 provides structural support for the outer portion of the arm beyond that created by the arm, itself; and U.S. Pat. No. 4,203,707 requires a bearing both on the top and the bottom of the central shaft in order to create such support. (U.S. Pat. No. 2,247,929 also employs a bearing both near the top and the bottom of the central shaft but does not thereby generate support for the outer portion of the arm.)

Moreover, U.S. Pat. No. 4,115,027 employs an airfoil rather than just a vane, which is substantially planar, to intercept the wind; and the vane of U.S. Pat. No. 4,818,180 rotates about a horizontal axis so that the weight of the vane would cause it to drop, creating forces from the wind on both sides of the central shaft so that the resultant rotary force is reduced.

Patents which apply to multiple vanes on each of several arms that are designed to provide rotary motion to a central shaft when the vanes on one or more arms intercepts the wind are Danish U.S. Pat. No. 29377; U.S. Pat. No. 4,496,283; U.S. Pat. No. 4,534,703; U.S. Pat. No. 5,256,034; and U.S. Pat. No. 5,266,006.

Of this latter category of patents, only patent no. 4,534,703 has a provision for providing structural support for the outer portion of the arm beyond that created by the arm, itself; and U.S. Pat. No. 4,534,703 does so by placing wheels near the outer end of the arm to roll on a substantially horizontal surface.

Moreover, U.S. Pat. Nos. 4,496,283 and 5,266,006 utilize bearings near the top and bottom of the central shaft that do not provide support for the outer portion of the arm.

None of the preceding patents, however, utilize two or more bearings along the central shaft, all of such bearing being on the same side of the arms, to stabilize the central shaft.

Within the category of patents each of whose arms support more than one vane, only U.S. Pat. Nos. 4,534,703 and 5,256,034 mechanically coordinate the movement of all vanes (or, in the case of U.S. Pat. No. 5,256,034, airfoils) on a given arm. (Although not explicitly recognized in either patent, such coordination precludes adjacent vanes from becoming entangled with one another. In fact, U.S. Pat. No. 5,256,034 declares that the purpose for the coordination is to cause the airfoils to be "orientable to take maximum advantage of the wind flowing pat the device.") U.S. Pat. No. 4,534,703, however, also mechanically coordinates the movement of vane on opposite sides of the central shaft; if the direction of the wind along the rather substantial length of both arms is not uniform, this coordination will cause some vanes to be in a position that reduces the total rotational force that is generated and is unnecessary for avoiding entanglement of vanes because the vanes on opposite arms could not become entangled with one another. Additionally, U.S. Pat. No. 5,256,034 has the mechanical mechanism which provides the coordination attached to the airfoils.

And the only patents discussed above which indicate the type of material from which the vanes can be made are U.S. Pat. Nos. 2,247,929 and 4,496,283. On lines 18 through 20 of column 2, U.S. Pat. No. 2,274,929 states, "The vanes 26 consist preferably of sheet metal, but other suitable material may be employed." And in lines 45 through 46 of column 2, U.S. Pat. No. 4,496,283 observes that the vents "may be made of a solid rigid material such as sheet metal or plastic." None of the preceding patent, though, notes that plastic or fiberglass is not strong enough and that metal and aluminum strike the frame with such momentum that the vanes destroy the structure whereas a light but strong material such as PLEXIGLAS has sufficient strength to withstand the force of the wind with sufficiently low momentum that the frame is usually not even struck by the vanes but would not be damaged if such a collision did occur.

SUMMARY OF THE INVENTION

The present invention coordinates the movement of multiple vanes on a given arm without also mechanically coordinating the movement of vane on opposite sides of the central shaft, this precludes vanes from becoming entangled with one another but avoids reducing the total rotational force that is generated if the direction of the wind along the rather substantial length of both arms is not uniform.

Additionally, the mechanical mechanism which produces the desired coordination of vanes on a given arm is not directly connected to the vanes because, once selected to be appropriately light, the vanes would not be able to support such a mechanism, even though they are strong enough to withstand foreseeable forces from the wind.

Moreover, the present invention has vanes composed of a light but strong material such as PLEXIGLAS so that the vanes can withstand foreseeable winds but will not strike the any portion of the Wind-powered Drive Shaft with sufficient momentum to cause damage.

Also, the present invention utilizes two or more bearings along the central shaft, all of such bearings being on the same side of the arms, to stabilize the central shaft.

And without using wheels or requiring a bearing both on the top and the bottom of the central shaft, the present invention provides structural support for the outer portion of the arm beyond that created by the arm, itself.

Finally, neither does the present invention require a bearing both near the top and near the bottom of the central shaft.

DESCRIPTION OF THE PREFERRED EMBODIMENT

Figure 1:
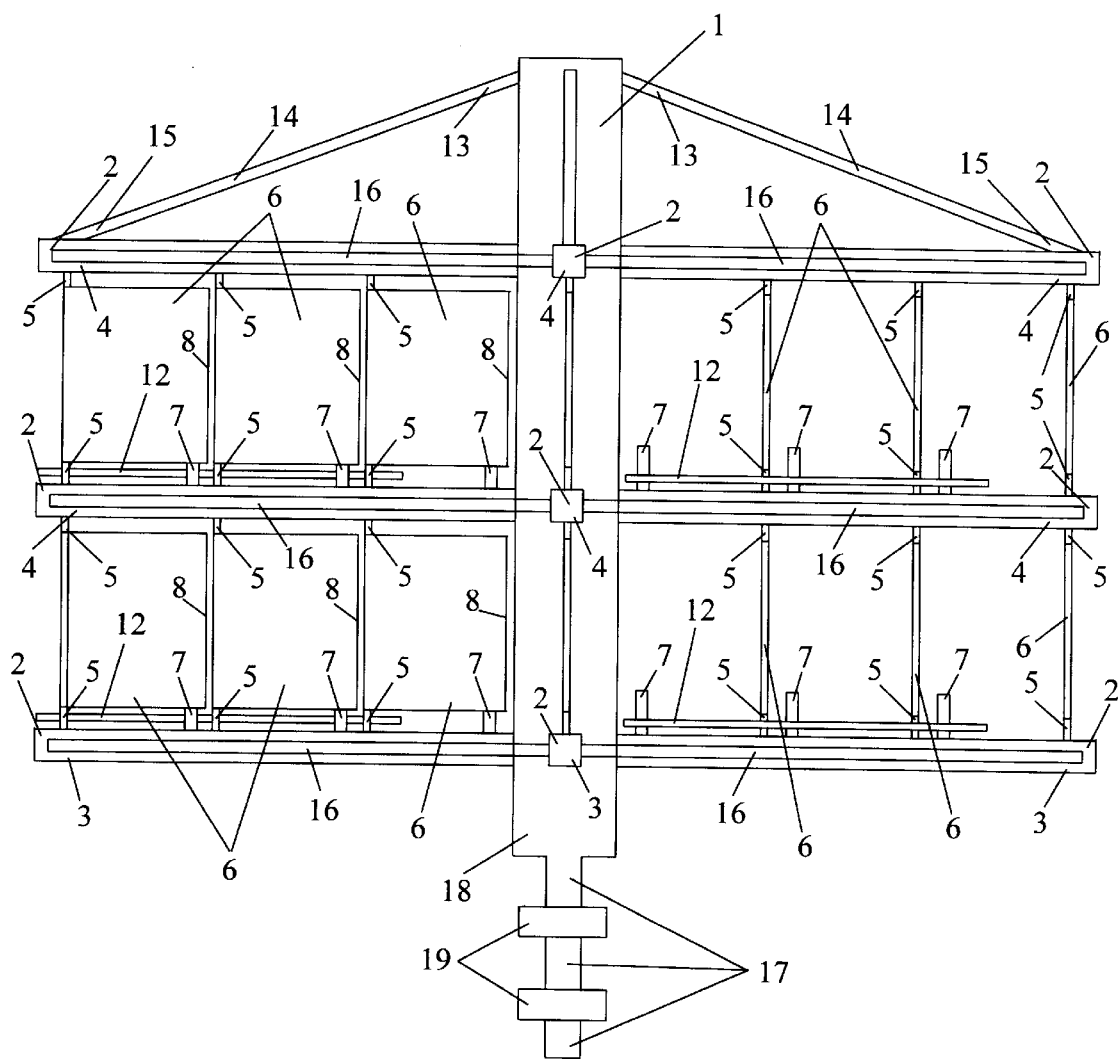
FIG. 1 is a lateral view of the Wind-powered drive shaft.
Figure 2:
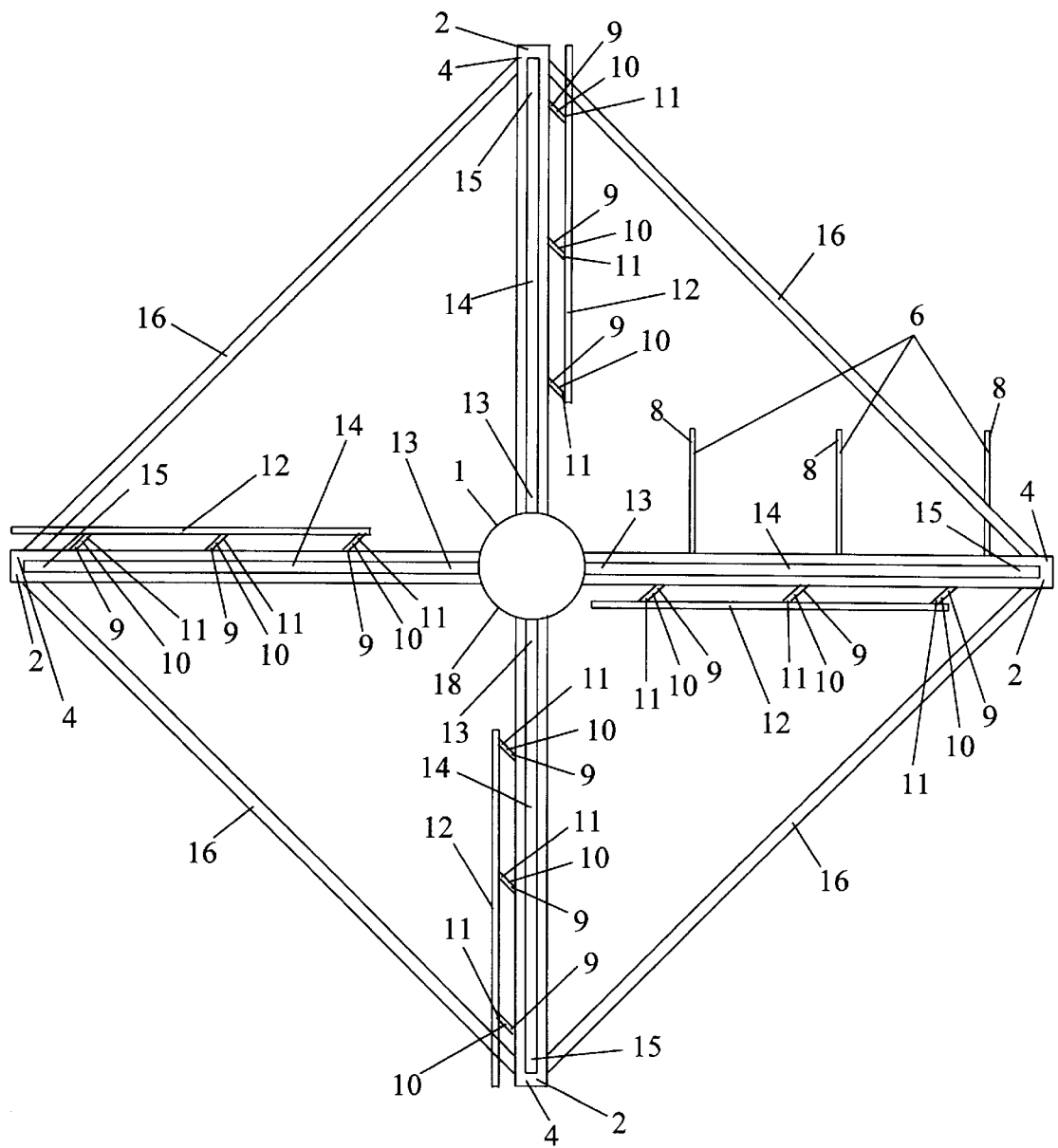
FIG. 2 depicts the Wind-powered Drive Shaft as viewed from the top.

As illustrated in FIG. 1, the Wind-powered Drive Shaft has a central shaft 1 attached to two or more sets of arms 2.

Each set of arms 2 extends radially outward from the central shaft 1 and preferably includes a lower arm 3 and an upper arm 4.

Rotatably attached to each lower arm 3 and to each upper arm 4 are two or more vertical pivot shafts 5. A vane 6 is connected to and extends outward from each pivot shaft 5. A stop 7 is attached to the lower arm 3 or the upper arm 4 or both the lower arm 3 and the upper arm 4 such that the free end 8 of the vane 6 will contact the stop 7 when such free end 8 makes its closest approach to the central shaft 1.

If desired, additional upper arms 4 could be included in each set of arms 2. If this is done, then vanes 6 would be located between all vertically adjacent arms 3 or 4 as would all elements necessary for the proper functioning of such vanes 6.

The sets of arms 2 are preferably arranged in pairs about the central shaft 1 with a first set 2 on one side of the central shaft 1 and the other set 2 on substantially the opposite side of the central shaft 1 from the first set 2. Then when the wind blows the vanes 6 on one the first set of arms 2 against the stop 7, creating a torque on the first set of arms 2 about the central shaft 1, the wind will tend to blow the vanes 6 on the other set of arms 2 open, creating essentially no resistance and torque. Through this process, the wind rotates the sets of arms 6 and thereby the central shaft 1.

Even, however, were there only one set of arms 2, the stop 7 would, as described above, cause the vanes 6 to generate torque on only one side of the central shaft 1.

With winds that rapidly change direction, however, different vanes 6 on a given set of arms 2 could be blown in different directions and become entangled with one another. To preclude such entanglement, the movement of all vanes 6 on a given set of arms 2 is coordinated This is accomplished by attaching a first end 9 of an offset arm 10 to each pivot shaft 5 on a given set of arms 2 and rotatably attaching a second end 11 of each offset arm 10 for the given set of arms 2 to a rod 12. Then, as any of the vanes 6 on a given set of arms 2 rotates a certain distance, all other vanes 6 on the given set of arms 2 must rotate the same distance.

In order to allow the vanes 6 to move substantially parallel to the given set of arms 2, the offset arm 10 associated with a given pivot shaft 5 must not be within the same plane as the vane 6 associated with that same pivot shaft. Therefore, the offset arm 10 is oriented a some angle, preferably approximately three degrees, with respect to the plane containing the vane 6.

The vanes 6 are composed of a light but strong material, preferably PLEXIGLAS, so that the vanes 6 can withstand foreseeable winds but will not strike any portion of the Wind-powered Drive Shaft with sufficient momentum to cause damage.

Structural support for the sets of arms 2 is preferably provided by attaching a first end 13 of a support arm 14 to the central shaft 1 and a second end 15 of the support arm to the highest upper arm 4, preferably near the end of the upper arm 4 that is farther from the central shaft 1 and by connecting a torque arm 16 between adjacent lower arms 3 and another torque arm 16 between adjacent upper arms 4. The angle between the support arm 14 and the upper arm 4 should be such that substantial support is provided, preferably not less than twenty-five degrees.

To enable the Wind-powered Drive Shaft to be as light as possible, the central shaft 1 is preferably composed of a lower portion 17, which is preferably solid, attached to a tubular upper portion 18 having a larger diameter than the lower portion 17. The more arms that are in a set of arms 2, the greater will be the diameter of the tubular upper portion 18 of the central shaft 1, in order to provide adequate strength.

Two or more bearings 19 are located along the central shaft 1, all of such bearings 19 being on the same side of the sets of arms 2, for supporting the Wind-powered Drive Shaft.

The central shaft 1, preferably the lower portion 17, is available to provide rotary force for a variety of purposes, such as to drive a hydraulic pump, the crankshaft for a water pump, or an electrical generator.

I claim:

1. A wind-powered drive shaft, which comprises:

a central shaft;

a set of arms attached to and extending radially outward from said central shaft, said set of arms comprising a lower arm and one or more upper arms;

two or more pivot shafts rotatably attached to each lower arm and to each upper arm;

a vane composed of a light but strong material connected to and extending radially outward from each pivot shaft between each pair of vertically adjacent arms;

a stop attached to one arm of every two vertically adjacent arms, said stop being in such a location that the free end of the vane will contact said stop when such free end makes its closes approach to said central shaft;

an offset arm for each pivot shaft on said set of arms, a first end of said offset arm beings attached to said pivot shaft; and a rod rotatably attached to a second end of each offset arm.

2. The wind-powered drive shaft as recited in claim 1, wherein:

said vane is composed of PLEXIGLAS.

3. The wind-powered drive shaft as recited in claim 2, further comprising:

a support arm, the first end of said support arm being connected to said central shaft and the second end of said support arm being connected to the highest upper arm in said set of arms; and a torque arm connected between adjacent lower arms.

4. The wind-powered drive shaft as recited in claim 3, further comprising:

two or more bearings located along the central shaft, all of said bearings being or the same side of said set of arms.

5. The wind-powered drive shaft as recited in claim 4, wherein:

said central shaft comprises a solid lower portion attached to a tubular upper portion, said tubular upper portion having a larger diameter than said lower portion.

6. The wind-powered drive shaft as recited in claim 3, wherein:

said central shaft comprises a solid lower portion attached to a tubular upper portion, said tubular upper portion having a larger diameter than said lower portion.

7. The wind-powered drive shaft as recited in claim 2, further comprising:

two or more bearings located along the central shaft, all of said bearings being on the same side of said set of arms.

8. The wind-powered drive shaft as recited in claim 7, wherein:

said central shaft comprises a solid lower portion attached to a tubular upper portion, said tubular upper portion having a larger diameter than said lower portion.

9. The wind-powered drive shaft as recited in claim 2, wherein:

said central shaft comprises a solid lower portion attached to a tubular upper portion, said tubular upper portion having a larger diameter than said lower portion.

10. The wind-powered drive shaft as recited in claim 1, further comprising:

a support arm, the first end of said support arm being connected to said central shaft and the second end of said support arm being connected to the highest upper arm in said set of arms; and a torque arm connected between adjacent lower arms.

11. The wind-powered drive shaft as recited in claim 10, further comprising:

two or more bearings located along the central shaft, all of said bearings being on the same side of said set of arms.

12. The wind-powered drive shaft as recited in claim 11, wherein:

said central shaft comprises a solid lower portion attached to a tubular upper portion, said tubular upper portion having a larger diameter than said lower portion.

13. The wind-powered drive shaft as recited in claim 10, wherein:

said central shaft comprises a solid lower portion attached to a tubular upper portion, said tubular upper portion having a larger diameter than said lower portion.

14. The wind-powered drive shaft as recited in claim 1, further comprising:

two or more bearings located along the central shaft, all of said bearings being on the same side of said set of arms.

15. The wind-powered drive shaft as recited in claim 14, wherein:

said central shaft comprises a solid lower portion attached to a tubular upper portion, said tubular upper portion having a larger diameter than said lower portion.

16. The wind-powered drive shaft as recited in claim 1, wherein:

said central shaft comprises a solid lower portion attached to a tubular upper portion, said tubular upper portion having a larger diameter than said lower portion.

* * * * *